United States Patent
Kwak et al.

(10) Patent No.: US 6,742,009 B1
(45) Date of Patent: May 25, 2004

(54) APPARATUS AND METHOD FOR FAST DISCRETE COSINE TRANSFORM WITH SAME POSITIONS OF INPUT AND OUTPUT DATA

(75) Inventors: Jin-Suk Kwak, Taejon (KR); Myoung-Ho Lee, Taejon (KR); Chie-Teuk Ahn, Taejon (KR)

(73) Assignees: Electronics and Telecommunications Research Institute, Daejon (KR); VK Corporation, Kyonggi-do (KR)

(*) Notice: Subject to any disclaimer, the term of this patent is extended or adjusted under 35 U.S.C. 154(b) by 0 days.

(21) Appl. No.: 09/477,854

(22) Filed: Jan. 5, 2000

(30) Foreign Application Priority Data

Sep. 16, 1999 (KR) .................................. 1999-39946

(51) Int. Cl.[7] .............................................. G06F 17/14
(52) U.S. Cl. ..................................................... 708/401
(58) Field of Search ................................ 708/401–402

(56) References Cited

U.S. PATENT DOCUMENTS

| | | | |
|---|---|---|---|
| 5,719,963 A | 2/1998 | Kazui et al. | |
| 5,748,514 A | 5/1998 | Okada et al. | |
| 5,831,881 A | 11/1998 | Fiedrich et al. | |
| 6,237,012 B1 * | 5/2001 | Ohgose | 708/402 |
| 6,374,280 B1 * | 4/2002 | Li | 708/402 |

OTHER PUBLICATIONS

Lee and Huang, "Restructured Recursive DCT and DST Algorithms", IEEE Transactions on Signal Processing, vol. 42, 7/94, pp. 1600–1609.

Astola and Akopian, "Architecture–Oriented Regular Algorithms for Discrete Sine and Cosine Transforms", IEEE Transactions on Signal Processing, vol. 47, 4/99, pp. 1109–1124.

Chan and Ho, "A New Two–Dimensional Fast Cosine Transform Algorithm", IEEE Transactions on Signal Processing, vol. 39, 2/91, pp. 481–485.

* cited by examiner

*Primary Examiner*—Tan V. Mai
(74) *Attorney, Agent, or Firm*—Blakely, Sokoloff, Taylor & Zafman

(57) ABSTRACT

An apparatus and a method for carrying out a fast discrete cosine transform (DCT) with same positions of input and output data, and also a recording medium which is readable by a computer with a program loaded thereon, are disclosed. In the intermediate arithmetic procedure of the one-dimensional or two-dimensional forward or inverse DCT, the positions of the input and output data are made same, and therefore, an additional memory is not required. Specifically, the apparatus for carrying out the fast discrete cosine transform (DCT) with same positions of input and output data includes an input data sequence transposing means for transposing a sequence of an externally inputted input data by using a transposing matrix E. A butterfly arithmetic means carries out a butterfly arithmetic operation by using a $G_{t-1}B_{t-1} \cdot G_{t-2}B_{t-2} \ldots G_0B_0$ matrix on a data obtained as a result of transposing the sequence of the input data by the input data sequence transposing means. A repeated addition and regularization arithmetic means carries out a repeated addition and regularization arithmetic operation by using an $F_kQ_0Q_1 \ldots Q_{t-1}$ matrix on a data obtained as a result of carrying out the butterfly arithmetic operation by the butterfly arithmetic means. The present invention is applicable to the conversion and inversion of digital signals.

12 Claims, 6 Drawing Sheets

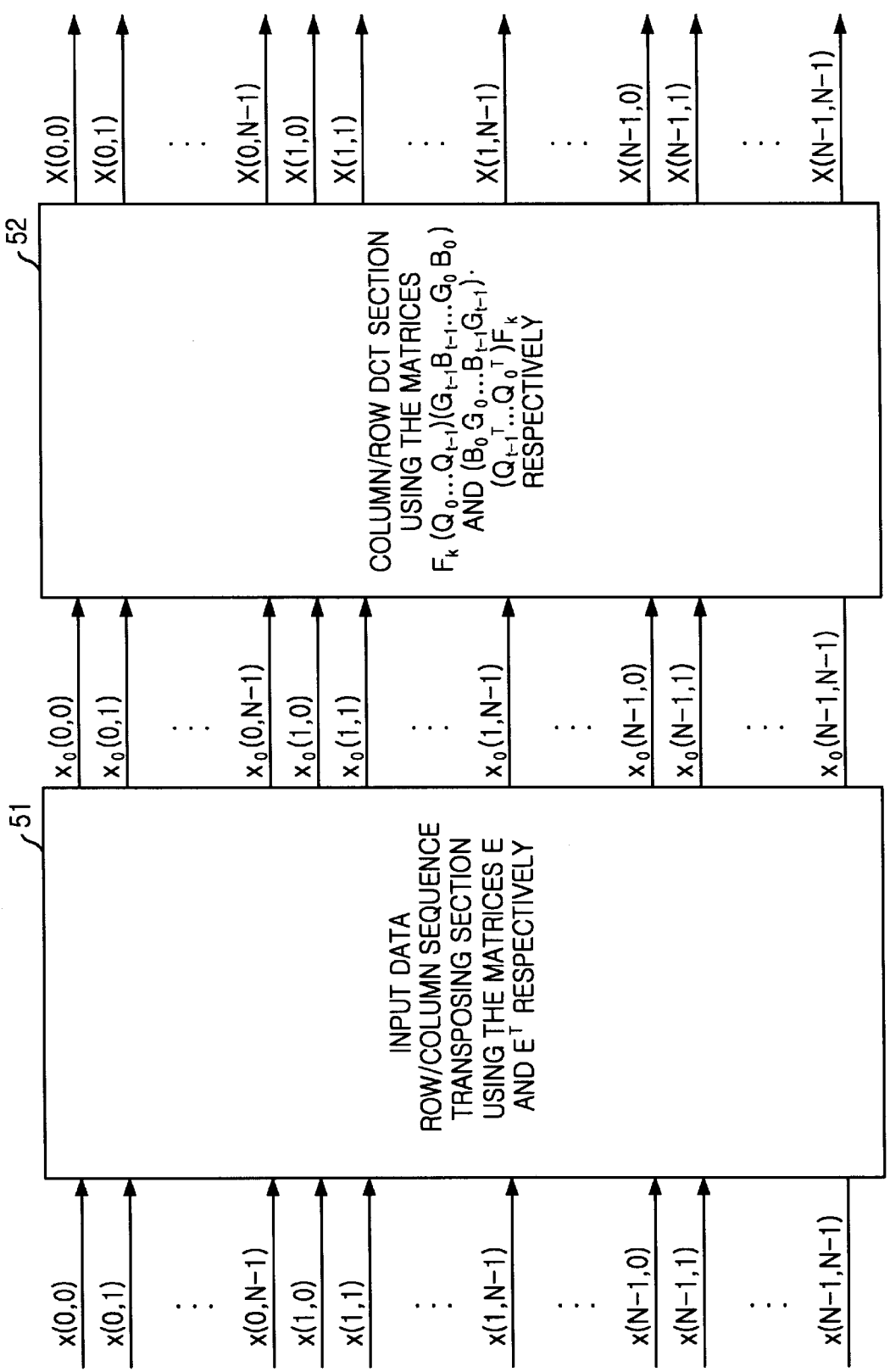

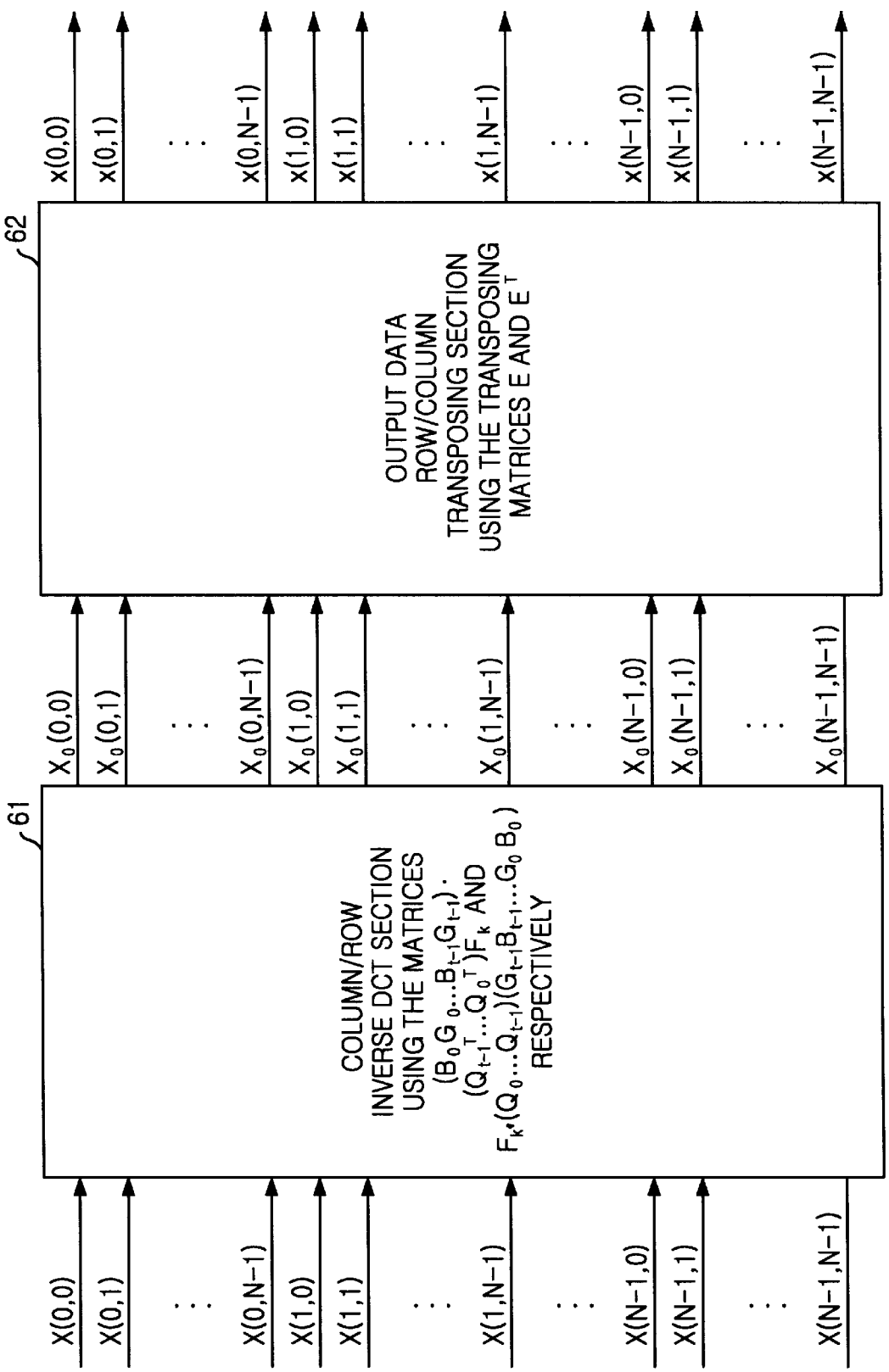

APPARATUS AND METHOD FOR FAST DISCRETE COSINE TRANSFORM WITH SAME POSITIONS OF INPUT AND OUTPUT DATA

BACKGROUND OF THE INVENTION

1. Field of the Invention

The present invention relates to an apparatus and a method for carrying out a fast discrete cosine transform (to be called DCT below) with same positions of input and output data, and also relates to a recording medium which is readable by a computer with a program loaded thereon. Particularly, the present invention relates to an apparatus and a method for carrying out a fast discrete cosine transform with same positions of input and output data, and also relates to a recording medium readable by a computer with a program loaded thereon, in which in the case where a one-dimensional or two-dimensional forward or inverse discrete cosine transform is used for converting or inverse-converting digital signals, the required arithmetic amount is effectively reduced, and the positions of the input and output data are same, thereby making an additional memory needless.

2. Description of the Prior Art

Conventionally, there have been fast arithmetic methods for realizing one-dimensional and two-dimensional forward and inverse DCT. That is, there is U.S. Pat. No. 5,831,881 entitled "Method and Circuit for Forward/Inverse Discrete Cosine Transform" issued on Nov. 3, 1998 to Fiedrich et al. Further, there is U.S. Pat. No. 5,719,963 entitled "Two-Dimensional Discrete Cosine Transform Computing Circuit" issued on Feb. 17, 1998 to Kazui et. al. Furthermore, there is U.S. Pat. No. 5,748,514 entitled "Forward and Inverse Discrete Cosine Transform Circuits" issued on May 5, 1998 to Okada et. al.

In the above cited methods, in order to carry out a fast discrete cosine transform, there are included: a procedure of transposing the sequence of the input data; a butterfly arithmetic procedure; a repeated addition arithmetic procedure; and a procedure of transposing the sequence of the output data.

Thus the conventional methods undergo many procedures, and therefore, the arithmetic amount is enormously increased.

Particularly, in the conventional methods, the positions of the input and output data are not same in the intermediate arithmetic procedure. Therefore, in using the one-dimensional and two-dimensional forward/inverse DCT, there has to be used an additional memory.

SUMMARY OF THE INVENTION

The present invention is intended to overcome the above described disadvantages of the conventional techniques.

Therefore it is an object of the present invention to provide an apparatus and a method for carrying out a fast discrete cosine transform (DCT) with same positions of input and output data, and a recording medium readable by a computer with a program loaded thereon, in which, in the intermediate arithmetic procedure of the of the one-dimensional or two-dimensional forward or inverse DCT, the positions of the input and output data are same so as to make an additional memory needless.

It is another object of the present invention to provide an apparatus and a method for carrying out a fast discrete cosine transform with same positions of input and output data, and a recording medium readable by a computer with a program loaded thereon, in which the required arithmetic amount is effectively reduced.

In achieving the above objects, a first apparatus for carrying out a fast DCT with same positions of input and output data according to the present invention includes: an input data sequence transposing means for transposing the sequence of an externally inputted input data by using a transposing matrix E; a butterfly arithmetic means for carrying out a butterfly arithmetic operation by using a $G_{t-1} B_{t-1}.G_{t-2}B_{t-2} \ldots G_0 B_0$ matrix on a data obtained as a result of transposing the sequence of the input data by the input data sequence transposing means; and a repeated addition and regularization arithmetic means for carrying out a repeated addition and regularization arithmetic operation by using an $F_k Q_0 Q_1 \ldots Q_{t-1}$ matrix on a data obtained as a result of the butterfly arithmetic operation by the butterfly arithmetic means.

In a second aspect of the present invention, a first method applied to an apparatus for carrying out a fast DCT with same positions of input and output data according to the present invention includes the steps of: a) transposing the sequence of an externally inputted input data by using a transposing matrix E; b) carrying out a butterfly arithmetic operation by using a $G_{t-1}B_{t-2}. G_{t-2}B_{t-2} \ldots G_0B_0$ matrix on a data obtained as a result of transposing the sequence of the input data at the step b); and c) carrying out a repeated addition and regularization arithmetic operation by using an $F_k Q_0 Q_1 \ldots Q_{t-1}$ matrix on a data obtained as a result of the butterfly arithmetic operation at the step b).

In a third aspect of the present invention, a second apparatus for carrying out a fast DCT with same positions of input and output data according to the present invention includes: a repeated addition and regularization arithmetic means for carrying out a repeated addition and regularization arithmetic operation by using an $Q_{t-1}{}^T Q_{t-2}{}^T \ldots Q_0{}^T.F_k$ matrix on an externally inputted data; a butterfly arithmetic means for carrying out a butterfly arithmetic operation by using a $B_0 G_0.B_1 G_1 \ldots B_{t-1} G_{t-1}$ matrix on a data obtained as a result of carrying out a repeated addition and regularization arithmetic operation by the repeated addition and regularization arithmetic means; and an input data sequence transposing means for transposing the sequence of an output data by using a transposing matrix $E^T$ on a data obtained by carrying out the butterfly arithmetic operation by the butterfly arithmetic means.

In a fourth aspect of the present invention, a second method applied to an apparatus for carrying out a fast DCT with same positions of input and output data according to the present invention includes the steps of: a) carrying out a repeated addition and regularization arithmetic operation by using an $Q_{t-1}{}^T Q_{t-2}{}^T \ldots Q_0{}^T.F_k$ matrix on an externally inputted data; b) carrying out a butterfly arithmetic operation by using a $B_0 G_0.B_1 G_1 \ldots B_{t-1} G_{t-1}$ matrix on a data obtained as a result of carrying out a repeated addition and regularization arithmetic operation by the repeated addition and regularization arithmetic means at the step a); and c) transposing the sequence of the data by using a transposing matrix $E^T$ on a data obtained by carrying out the butterfly arithmetic operation at the step b).

In a fifth aspect of the present invention, a third apparatus for carrying out a fast DCT with same positions of input and output data according to the present invention includes: an input data row sequence/column sequence transposing means for transposing the sequences of rows and columns of an externally inputted two-dimensional input data by using transposing matrices $E^T$ and E; and a row/column DCT means for carrying out a one-dimensional forward DCT by using an $F_k \cdot \{Q_0 \cdot Q_1 \Lambda Q_{t-1}\} \cdot \{G_{t-1} B_{t-1} \cdot G_{t-2} B_{t-2} \Lambda G_0 B_0\}$ matrix on a row data obtained as a result of transposing the sequences of rows and columns of the externally inputted two-dimensional input data by the input data row sequence/column sequence transposing means, and for carrying out a one-dimensional forward DCT by using a $\{B_0 G_0 \cdot B_1 G_1 \Lambda B_{t-1} G_{t-1}\} \cdot \{Q_{t-1}^T \cdot Q_{t-2}^T \Lambda Q_0^T\} F_k$ matrix on a column data obtained as a result of transposing the sequences of rows and columns of the externally inputted two-dimensional input data by the input data row sequence/column sequence transposing means.

In a sixth aspect of the present invention, a third method applied to an apparatus for carrying out a fast DCT with same positions of input and output data according to the present invention includes the steps of: a) transposing the sequences of rows and columns of an externally inputted two-dimensional input data by using transposing matrices $E^T$ and E; and b) carrying out a one-dimensional forward DCT by using an $F_k \cdot \{Q_0 \cdot Q_1 \Lambda Q_{t-1}\} \cdot \{G_{t-1} B_{t-1} \cdot G_{t-2} B_{t-2} \Lambda G_0 B_0\}$ matrix on a row data obtained as a result of transposing the sequences of rows and columns of the externally inputted two-dimensional input data by the input data row sequence/column sequence transposing means at the step a), and c) carrying out a one-dimensional forward DCT by using a $\{B_0 G_0 \cdot B_1 G_1 \Lambda B_{t-1} G_{t-1}\} \cdot \{Q_{t-1}^T \cdot Q_{t-2}^T \Lambda Q_0^T\} F_k$ matrix on a column data obtained as a result of transposing the sequences of rows and columns of the externally inputted two-dimensional input data by the input data row sequence/column sequence transposing means at the step a).

In 7th aspect of the present invention, a fourth apparatus for carrying out a fast DCT with same positions of input and output data according to the present invention includes: a row/column DCT means for carrying out a one-dimensional inverse DCT by using a $\{B_0 G_0 \cdot B_1 G_1 \Lambda B_{t-1} G_{t-1}\} \cdot \{_{t-1}^T \cdot Q_{t-2}^T \Lambda Q_0^T\} F_k$ matrix on a row data of an externally inputted two-dimensional input data, and for carrying out a one-dimensional inverse DCT by using an $F_k \cdot \{Q_0 \cdot Q_1 \Lambda Q_{t-1}\} \cdot \{G_{t-1} B_{t-1} \cdot G_{t-2} B_{t-2} \Lambda G_0 B_0\}$ matrix on a column data of the externally inputted two-dimensional input data; and an input data row sequence/column sequence transposing means for transposing the sequences of rows and columns of the two-dimensional input data obtained from the row/column inverse DCT means by using transposing matrices $E^T$ and E.

In an 8th aspect of the present invention, a fourth method applied to an apparatus for carrying out a fast DCT with same positions of input and output data according to the present invention includes the steps of: a) carrying out a one-dimensional inverse DCT by using a $\{B_0 G_0 \cdot B_1 G_1 \Lambda B_{t-1} G_{t-1}\} \cdot \{Q_{t-1}^T \cdot Q_{t-2}^T \Lambda Q_0^T\} F_k$ matrix on a row data of an externally inputted two-dimensional input data, and for carrying out a one-dimensional inverse DCT by using an $F_k \cdot \{Q_0 \cdot Q_1 \Lambda Q_{t-1}\} \cdot \{G_{t-1} B_{t-1} \cdot G_{t-2} B_{t-2} \Lambda G_0 B_0\}$ matrix on a column data of the externally inputted two-dimensional input data; and b) transposing the sequences of rows and columns of the two-dimensional input data obtained from the row/column inverse DCT means by using transposing matrices $E^T$ and E.

In a 9th aspect of the present invention, a fifth apparatus for carrying out a fast DCT with same positions of input and output data according to the present invention includes: an input data row sequence/column sequence transposing means for transposing the sequences of rows and columns of an externally inputted two-dimensional input data by using a transposing matrix $(S^T \otimes S^T)(E_N \otimes E_N)$; a butterfly arithmetic means for carrying out a butterfly arithmetic operation by using a $$\{(S^T \otimes S^T)(A_{t-1} \otimes A_{t-1})(S \otimes S)\}\{S^T \otimes S^T\}(H_{t-1} \otimes H_{t-1})(S \otimes S)\}$$

$$\Lambda\{(S^T \otimes S^T)(A_0 \otimes A_0)(S \otimes S)\}\{(S^T \otimes S^T)(H_0 \otimes H_0)(S \otimes S)\}$$

matrix on a two-dimensional data obtained as a result of transposing the sequences of the two dimensional data by the input data row sequence/column sequence transposing means; and a repeated addition and regularization arithmetic means for carrying out a repeated addition and regularization arithmetic operation by using a $(F_k \otimes F_k)(Q_0 \otimes I_N)\Lambda (Q_{t-1 \otimes IN})(I_N \otimes Q_0)\Lambda (I_N \otimes Q_{t-1})$ matrix on a data obtained as a result of the butterfly arithmetic operation by the butterfly arithmetic means.

In a 10th aspect of the present invention, a 5th method applied to an apparatus for carrying out a fast DCT with same positions of input and output data according to the present invention includes the steps of: a) transposing the sequences of rows and columns of an externally inputted two-dimensional input data by using a transposing matrix $(S^T \otimes S^T).(E_N \otimes E_N)$; b) carrying out a butterfly arithmetic operation by using a $$\{(S^T \otimes S^T)(A_{t-1} \otimes A_{t-1})(S \otimes S)\}\{S^T \otimes S^T\}(H_{t-1} \otimes H_{t-1})(S \otimes S)\}$$

$$\Lambda\{(S^T \otimes S^T)(A_0 \otimes A_0)(S \otimes S)\}\{(S^T \otimes S^T)(H_0 \otimes H_0)(S \otimes S)\}$$

matrix on a two-dimensional data obtained as a result of transposing the sequences of the two dimensional data by the input data row sequence/column sequence transposing means at the step a); and c) carrying out a repeated addition and regularization arithmetic operation by using a $(F_k \otimes F_k)(Q_0 \otimes I_N)\Lambda Q_{t-1} \otimes I_N)(I_N \otimes Q_0)\Lambda (I_N \otimes Q_{t-1})$ matrix on a data obtained as a result of the butterfly arithmetic operation by the butterfly arithmetic means at the step b).

In an 11th aspect of the present invention, a 6th apparatus for carrying out a fast DCT with same positions of input and output data according to the present invention includes: a repeated addition and regularization arithmetic means for carrying out a repeated addition and regularization arithmetic operation by using a $(Q_{t-1}^T \otimes I_N)\Lambda (Q_0^T \otimes I_N)(I_N \otimes Q_{0t-1}^T)\Lambda (I_N \otimes Q_0^T)(F_k \otimes F_k)$ matrix on an externally inputted two-dimensional input data; a butterfly arithmetic means for carrying out a butterfly arithmetic operation by using a $$\{(S \otimes S)(A_0 \otimes A_0)(S^T \otimes S^T)\}\{(S \otimes S)(H_0 \otimes H_0)(S^T \otimes S^T)\}$$

$$\Lambda\{(S \otimes S)(A_{t-1} \otimes A_{t-1})(S^T \otimes S^T)\}\{(S \otimes S)(H_{t-1} \otimes H_{-10})(S^T \otimes S^T)\}$$

matrix on a two-dimensional data obtained as a result of carrying out the repeated addition and regularization arithmetic operation by the repeated addition and regularization arithmetic means; and an output data sequence transposing means for transposing the sequence of a two-dimensional output data by using a $(E_N^T \otimes E_N^T)(S \otimes S)$ matrix on a two-dimensional data obtained as a result of carrying out the butterfly arithmetic operation by the butterfly arithmetic means.

In a 12th aspect of the present invention, a 6th method applied to an apparatus for carrying out a fast DCT with same positions of input and output data according to the present invention includes the steps of: a) carrying out a repeated addition and regularization arithmetic operation by using a $(Q_{t-1}^T \otimes I_N) \Lambda (Q_0^T \otimes I_N)(I_N \otimes Q_{t-1}^T) \Lambda (I_N \otimes Q_0^T)(F_k \otimes F_k)$ matrix on an externally inputted two-dimensional input data; b) carrying out a butterfly arithmetic operation by using a $$\{(S \otimes S)(A_0 \otimes A_0)(S^T \otimes S^T)\}\{(S \otimes S)(H_0 \otimes H_0)(S^T \otimes S^T)\}$$
$$\Lambda\{(S \otimes S)(A_{t-1} \otimes A_{t-1})(S^T \otimes S^T)\}\{(S \otimes S)(H_{t-1} \otimes H_{t-1})(S^T \otimes S^T)\}$$

matrix on a two-dimensional data obtained as a result of carrying out the repeated addition and regularization arithmetic operation on the two dimensional data by the repeated addition and regularization arithmetic means at the step b); and c) transposing the sequence of a two-dimensional output data by using a $(E_N^T \otimes E_N^T)(S \otimes S)$ matrix on a two-dimensional data obtained as a result of carrying out the butterfly arithmetic operation by the butterfly arithmetic means at the step b).

In a thirteenth aspect of the present invention, a recording medium readable by a computer and with a program loaded thereon to be applied to a fast DCT arithmetic apparatus according to the present invention includes: a first function of transposing the sequence of an externally inputted input data by using a transposing matrix E; a second function of carrying out a butterfly arithmetic operation by using a $G_{t-1}B_{t-1} \cdot G_{t-2}B_{t-2} \ldots G_0B_0$ matrix on a data obtained as a result of transposing the sequence of the input data by the first function; and a third function of carrying out a repeated addition and regularization arithmetic operation by using an $F_k Q_0 Q_1 \ldots Q_{t-1}$ matrix on a data obtained as a result of the butterfly arithmetic operation by the second function.

In a fourteenth aspect of the present invention, a recording medium readable by a computer, with a program loaded thereon to be applied to a fast DCT arithmetic apparatus according to the present invention includes: a first function of carrying out a repeated addition and regularization arithmetic operation by using a $Q_{t-1}^T Q_{t-2}^T \ldots Q_0^T \cdot F_k$ matrix on an externally inputted data; a second function of carrying out a butterfly arithmetic operation by using a $B_0 G_0 \cdot B_1 G_1 \ldots B_{t-1} G_{t-1}$ matrix on a data obtained as a result of carrying out a repeated addition and regularization arithmetic operation by the first function; and a third function of transposing the sequence of an output data by using a transposing matrix $E^T$ on a data obtained by transposing the sequence of the externally inputted input data by the second function.

In a 15th aspect of the present invention, a recording medium readable by a computer, with a program loaded thereon to be applied to a fast DCT arithmetic apparatus according to the present invention includes: a first function of transposing the sequences of rows and columns of an externally inputted two-dimensional input data by using transposing matrices $E^T$ and E; and a second function of carrying out a one-dimensional forward DCT by using an $F_k \cdot \{Q_0 \cdot Q_1 \Lambda Q_{t-1}\} \cdot \{G_{t-1} B_{t-1} \cdot G_{t-2} B_{t-2} \Lambda G_0 B_0\}$ matrix on a row data obtained as a result of transposing the sequences of rows and columns of the externally inputted two-dimensional input data by the first function, and carrying out a one-dimensional forward DCT by using a $\{B_0 G_0 \cdot B_1 G_1 \Lambda B_{t-1} G_{t-1}\} \cdot \{Q_{t-1}^T \cdot Q_{t-2}^T \Lambda Q_0^T\} F_k$ matrix on a column data obtained as a result of transposing the sequences of rows and columns of the externally inputted two-dimensional input data by the first function.

In a 16th aspect of the present invention, a recording medium readable by a computer, with a program loaded thereon to be applied to a fast DCT arithmetic apparatus according to the present invention includes: a first function of carrying out a one-dimensional inverse DCT by using a $\{B_0 G_0 \cdot B_1 G_1 \Lambda B_{t-1} G_{t-1}\} \cdot \{Q_{t-1}^T \cdot Q_{t-2}^T \Lambda Q_0^T\} F_k$ matrix on a row data of an externally inputted two-dimensional input data, and carrying out a one-dimensional inverse DCT by using an $F_k \cdot \{Q_0 \cdot Q_1 \Lambda Q_{t-1}\} \cdot \{G_{t-1} B_{t-1} \cdot G_{t-2} B_{t-2} \Lambda G_0 B_0\}$ matrix on a column data of the externally inputted two-dimensional input data; and a second function of transposing the sequences of rows and columns of the two-dimensional input data obtained from the first function by using transposing matrices $E^T$ and E.

In a 17th aspect of the present invention, a recording medium readable by a computer, with a program loaded thereon to be applied to a fast DCT arithmetic apparatus according to the present invention includes: a first function of transposing the sequences of rows and columns of an externally inputted two-dimensional input data by using a transposing matrix $(S^T \otimes S^T)(E_N \otimes E_N)$; a second function of carrying out a butterfly arithmetic operation by using a $$\{(S^T \otimes S^T)(A_{t-1} \otimes A_{t-1})(S \otimes S)\}\{S^T \otimes S^T\}(H_{t-1} \otimes H_{t-1})(S \otimes S)\}$$
$$\Lambda\{(S^T \otimes S^T)(A_0 \otimes A_0)(S \otimes S)\}\{(S^T \otimes S^T)(H_0 \otimes H_0)(S \otimes S)\}$$

matrix on a two-dimensional data obtained as a result of transposing the sequences of the two dimensional data by the first function; and a third function of carrying out a repeated addition and regularization arithmetic operation by using a $(F_k \otimes F_k)(Q_0 \otimes I_N)\Lambda(Q_{t-1} \otimes I_N)(I_N \otimes Q_0)\Lambda(I_N \otimes Q_{t-1})$ matrix on a data obtained as a result of the butterfly arithmetic operation by the butterfly arithmetic means.

In an 18th aspect of the present invention, a recording medium readable by a computer, with a program loaded thereon to be applied to a fast DCT arithmetic apparatus according to the present invention includes: a first function of carrying out a repeated addition and regularization arithmetic operation by using a $(Q_{t-1}^T \otimes I_N)\Lambda(Q_0^T \otimes I_N)(I_N \otimes Q_{t-1}^T)\Lambda(I_N \otimes Q_0^T)(F_k \otimes F_k)$ matrix on an externally inputted two-dimensional input data; carrying out a butterfly arithmetic operation by using a $$\{(S \otimes S)(A_0 \otimes A_0)(S^T \otimes S^T)\}\{(S \otimes S)(H_0 \otimes H_0)(S^T \otimes S^T)\}$$
$$\Lambda\{(S \otimes S)(A_{t-1} \otimes A_{t-1})(S^T \otimes S^T)\}\{(S \otimes S)(H_{t-1} \otimes H_{t-1})(S^T \otimes S^T)\}$$

matrix on a two-dimensional data obtained as a result of carrying out the repeated addition and regularization arithmetic operation on the two dimensional data by the repeated addition and regularization arithmetic means; and transposing the sequence of a two-dimensional output data by using a $(E_N^T \otimes E_N^T)(S \otimes S)$ matrix on a two-dimensional data obtained as a result of carrying out the butterfly arithmetic operation by the second function.

BRIEF DESCRIPTION OF THE DRAWINGS

The above objects and other advantages of the present invention will become more apparent by describing in detail the preferred embodiment of the present invention with reference to the attached drawings in which:

FIG. 5 illustrates another example of the one-dimensional or two-dimensional forward fast DCT arithmetic apparatus and method according to the present invention; and FIG. 6 illustrates another example of the one-dimensional or two-dimensional inverse fast DCT arithmetic apparatus and method according to the present invention.

DETAILED DESCRIPTION OF THE PREFERRED EMBODIMENTS

Figure 1:
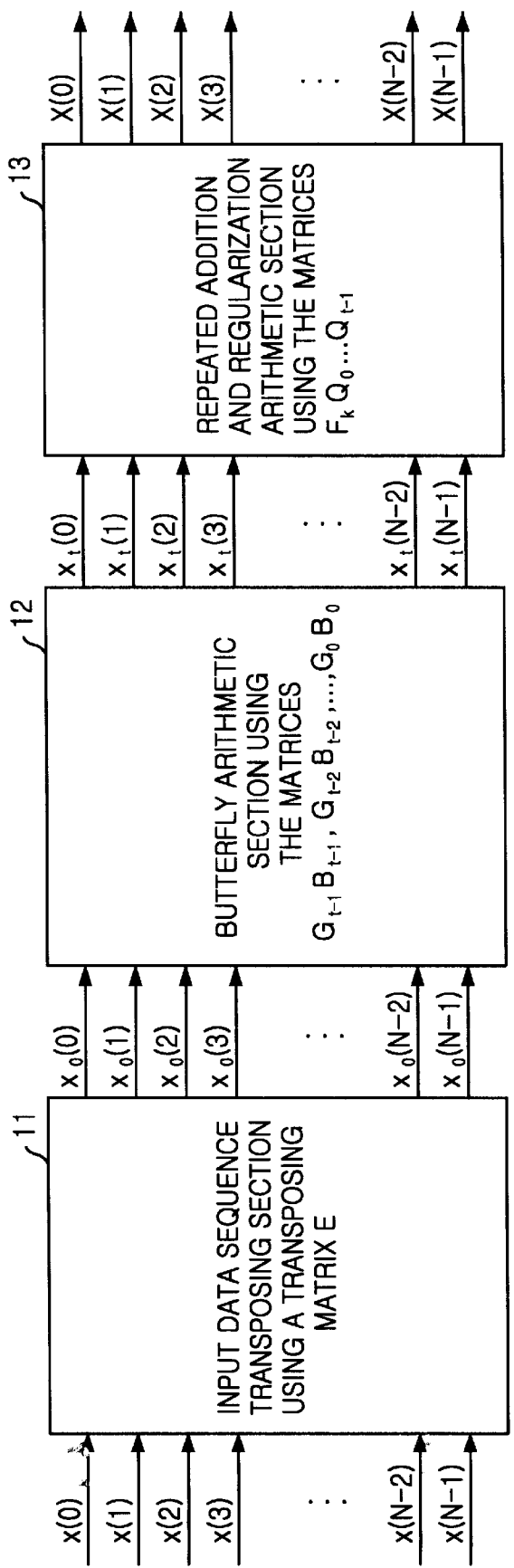
FIG. 1 illustrates an example of the one-dimensional or two-dimensional forward fast DCT arithmetic apparatus and method according to the present invention.

The present invention proposes: one-dimensional forward fast DCT arithmetic apparatus and method; one-dimensional inverse fast DCT arithmetic apparatus and method; two-dimensional forward fast DCT arithmetic apparatus and method I; two-dimensional inverse fast DCT arithmetic apparatus and method I; two-dimensional forward fast DCT arithmetic apparatus and method II; and two-dimensional inverse fast DCT arithmetic apparatus and method II. Each of these methods will be specifically described below.

1. One-dimensional Forward Fast DCT Arithmetic Apparatus and Method

The one-dimensional forward fast DCT arithmetic apparatus and method includes the steps of: a) transposing the sequence of an externally inputted data by using a transposing matrix E by an input data sequence transposing section 11; b) repeatedly carrying out a butterfly arithmetic operation by a butterfly arithmetic section 12 on a data obtained as a result of transposing the sequence of the input data at the step a); and carrying out a repeated addition and regularization arithmetic operation by a repeated addition and regularization section 13 on a data obtained at the step b).

Now the one-dimensional forward fast DCT arithmetic apparatus and method in which a length N of the input data is 2t as an embodiment of the present invention will be described in detail referring to the attached drawings.

First, if the one-dimensional input and output row vectors are assumed to be $[x(n)]^T$ and $[X(k)]^T$ respectively, then the one-dimensional forward DCT can be expressed by Formula (1) as shown below.

$$[X(k)]^T = F_k [C_{2N}^{k(2n+1)}(N,N)] \cdot [x(n)]^T \quad (1)$$

where $[X(k)]^T = [X(0), X(1), \ldots, X(N-1)]^T$ $[x(n)]^T = [x(0), x(1), \ldots, x(N-1)]^T$ $F_k$ is a diagonal matrix, $$[F_k]_{(k,k)} = \begin{cases} \sqrt{\dfrac{1}{n}} & k = 0 \\ \sqrt{\dfrac{2}{n}} & \text{otherwise} \end{cases}$$

$[C_{2N}^{k(2n+1)}(N,N)]$ is an N×N order DCT matrix, $[C_{2N}^{k(2n+1)}(N,N)]_{(k,n)} = \cos(\pi k(2n+1)/(2N))$ $0 \leq k$(row index), $n$(column index) $\leq N-1$ In the case where N is $2^t$, the calculation amount which is required in the one-dimensional forward DCT of Formula (1) can be effectively reduced. Further, in the intermediate procedure, by making the positions of the input and output data same, the one-dimensional forward fast DCT method in which an additional memory is not required can be expressed by Formula (2) as shown below.

$$[X(k)]^T = F_k \cdot (Q_0 \cdot Q_1 \wedge Q_{t-1})(G_{t-1} B_{t-1} \cdot G_{t-2} B_{t-2} \wedge G_0 B_0) \cdot E \cdot [x(n)]^T \quad (2)$$

where $[F_k]_{(k,k)} = \begin{cases} \sqrt{\dfrac{1}{n}} & k = 0 \\ \sqrt{\dfrac{2}{n}} & \text{otherwise} \end{cases}$ $$Q_q = \prod_{i=0}^{q} (I_{2^i} \otimes S_{2^{t-1}}) \cdot (I_{2^q} \otimes R_{2^{t-1}}) \cdot \prod_{i=0}^{q} (I_{2^i} \otimes S_{2^{t-1}})$$

$G_q = S^T \cdot A_q \cdot S$ $B_q = S^T \cdot H_q \cdot S$ $E = S^T \cdot E_N$ $$S = \prod_{i=1}^{t-1} (I_{2^i} \otimes S_{2^{t-i}})$$

$A_q = (I_{2^q} \otimes D_q)$ $D_{t-1} = \begin{bmatrix} 1 & 0 \\ 0 & C_4^1 \end{bmatrix}$ $D_q = \begin{bmatrix} I_{2^{t-q}-1} & 0 \\ 0 & [2C_{2^{t-q}-1}^{(4m+1)}(2^{(t-q-1)})] \end{bmatrix}, 0 \leq q \leq t-2$ $[2C_{2^{t-q}-1}^{(4m+1)}(2^{t-q-1})]$ is a diagonal matrix, $[2C_{2^{t-q}-1}^{(4m+1)}(2^{t-q-1})]_{(m,m)} = 2\cos\left[\dfrac{\pi(4m+1)}{2^{t-q-1}}\right]$ $H_q = \begin{bmatrix} I_{2^q} \otimes \begin{bmatrix} 1 & 1 \\ 1 & -1 \end{bmatrix} \otimes I_{2^{t-q-1}} \end{bmatrix}$ $0 \leq q \leq t-1$, $0 \leq m \leq 2^{t-q-1}-1$ The symbols which are used in the above formula are defined as follows.

Definition 1. The transposing matrices $E_N$ and $S_N$ are defined as follows:

$E_N \cdot [x(n)]^T = [x_0(m)]^T$ where $X_0(m) = \begin{cases} x(2m) & 0 \leq m \leq N/2-1 \\ x(2N-2m-1) & N/2 \leq m \leq N-1 \end{cases}$ $S_N \cdot [x(n)]^T = [x(0), x(2), \ldots x(N-2), x(1), x(3), \ldots x(N-1)]^T$ Definition 2. The repeated addition arithmetic matrix is defined as follows:

i) t=1
$R_2 = I_2$ ii) t>1

$R_N \cdot [x(n)]^T = [x(0), x(1), \ldots x(N/2-1), 2x(N/2), x(N/2+1) + x(N/2), \ldots, x(N-1) + x(N-2)]^T$ Definition 3. The arithmetic symbol ⊗ is defined as follows:

$$A_{m \times n} \otimes B_{p \otimes q} = \begin{bmatrix} a_{0,0} B_{p \times q} & a_{0,1} B_{p \times q} & \wedge & a_{0,n-1} B_{p \times q} \\ M & M & 0 & M \\ a_{m,0} B_{p \times q} & a_{m,1} B_{p \times q} & \wedge & a_{m,n-1} B_{p \times q} \end{bmatrix}$$

FIG. 1 illustrates an example of the one-dimensional or two-dimensional forward fast DCT arithmetic apparatus and method according to the present invention.

Here, the one-dimensional forward fast DCT apparatus and method will be examined, and the two-dimensional forward fast DCT apparatus and method will be described later. Now the one-dimensional forward fast DCT method according to the present invention will be described in detail referring to FIG. 1.

First, as shown in FIG. 1, the sequentially inputted N input data x(n) (n=0,1, ... N−1) undergo a transposition of the sequence, and as result, N-sequence-transposed data $x_0(m)$ (m=0, 1, ... N−1) are produced. In this context, the relationship of the input data x(n) (n=0,1, ... N−1) to the sequence-transposed data $x_0(m)$ (m=0,1, ... N−1) is defined in the definition 1.

Next, as shown in FIG. 1, the sequence-transposed data $x_0(m)$ (m=0,1, ... N−1) are used as the input data for the butterfly arithmetic operation by a $G_{t-1}B_{t-1}.G_{t-2}B_{t-2}$, ... $G_0B_0$ matrix. In this process, the butterfly arithmetic operation is carried out t times, and $G_qB_q$ is used for the q(q=0, 1, ... t−1)th butterfly arithmetic operation. That is, $G_0B_0$ is used for the first butterfly arithmetic operation, while $G_{t-1}B_{t-1}$ is used for the final butterfly arithmetic operation.

Next, the data $x_t(m)$ (m=0,1, ... N−1) which has been produced by completing t times of the butterfly operation is used as the input data for a repeated addition arithmetic operation by using a $F_kQ_0Q_1Q_{t-1}$ matrix as shown in FIG. 1. In this arithmetic procedure, the repeated addition arithmetic operation is carried out t times, and $Q_q$ is used for the q(q=0,1, ... , t−1)th repeated addition arithmetic operation. That is, for the first repeated addition arithmetic operation, $Q_{t-1}$ is used, while for the final repeated addition arithmetic operation, $Q_0$ is used. During this repeated addition arithmetic operation, a regularization arithmetic operation based on $F_k$ is accompanied.

Figure 2:
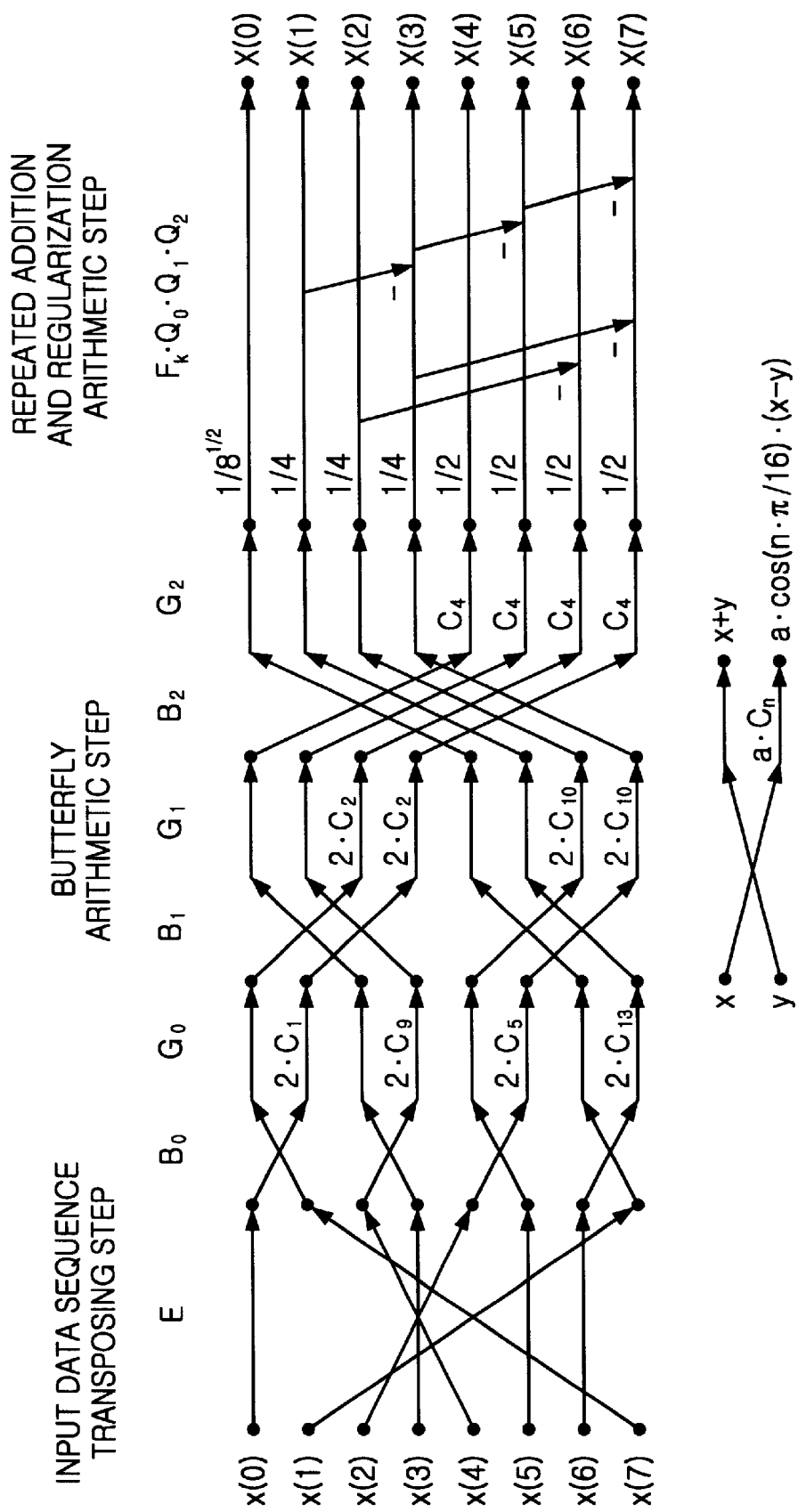
FIG. 2 is a flow chart showing an example of the one-dimensional or two-dimensional forward fast DCT arithmetic apparatus and method according to the present invention (N=8)

FIG. 2 is a flow chart showing an example of the one-dimensional or two-dimensional forward fast DCT arithmetic apparatus and method according to the present invention. This drawing shows the data flow in the one-dimensional forward fast DCT method in which the input data length N is 8.

First, in the case where the input data length N is 8, the sequentially inputted input data undergo a sequence transposition by a transposing matrix E as shown in the first step of FIG. 2. The sequence-transposed data undergo a butterfly arithmetic operation. In the butterfly arithmetic operation, the arithmetic steps are sequentially carried out based on $B_0$, $G_0$, $B_1$, $G_1$, $B_2$ and $G_2$. Then repeated addition and regularization arithmetic operations are carried out based on $F_kQ_0Q_1Q_2$ on the data which has been generated by the butterfly arithmetic operation. Thus there is obtained a sequentially aligned final output data.

2. One-dimensional Inverse Fast DCT Arithmetic Apparatus and Method

The one-dimensional inverse fast DCT arithmetic apparatus and method includes the steps of: a) carrying out a repeated addition and regularization arithmetic operation on an externally inputted data by a repeated addition and regularization arithmetic section 31; b) carrying out a butterfly arithmetic operation by a butterfly arithmetic section 32 on a data obtained as a result of carrying out a repeated addition and regularization arithmetic operation at the step a); and c) transposing the sequence of the data by an output data sequence transposing section 33 on a data obtained by carrying out the butterfly arithmetic operation at the step b).

Now the one-dimensional inverse fast DCT arithmetic apparatus and method in which the input data length N is $2^t$ will be described referring to the attached drawings as an embodiment of the present invention.

In the one-dimensional inverse fast DCT arithmetic method, by inverting the one dimensional forward fast DCT matrix of Formula (2), a formula (Formula (3)) can be obtained as specified below. Like in the one-dimensional forward fast DCT of Formula (2), the positions of the input data and the output data are also same in the one-dimensional inverse fast DCT of Formula (3). Therefore, an additional memory is not required.

$$[x(n)]^T = E^T \{B_0 G_0 . B_1 G_1 \wedge B_{t-1} G_{t-1}\} . \{Q_{t-1}^T . Q_{t-2}^T \wedge Q_0^T\} F_k[X(k)]^T \quad (3)$$

Figure 3:
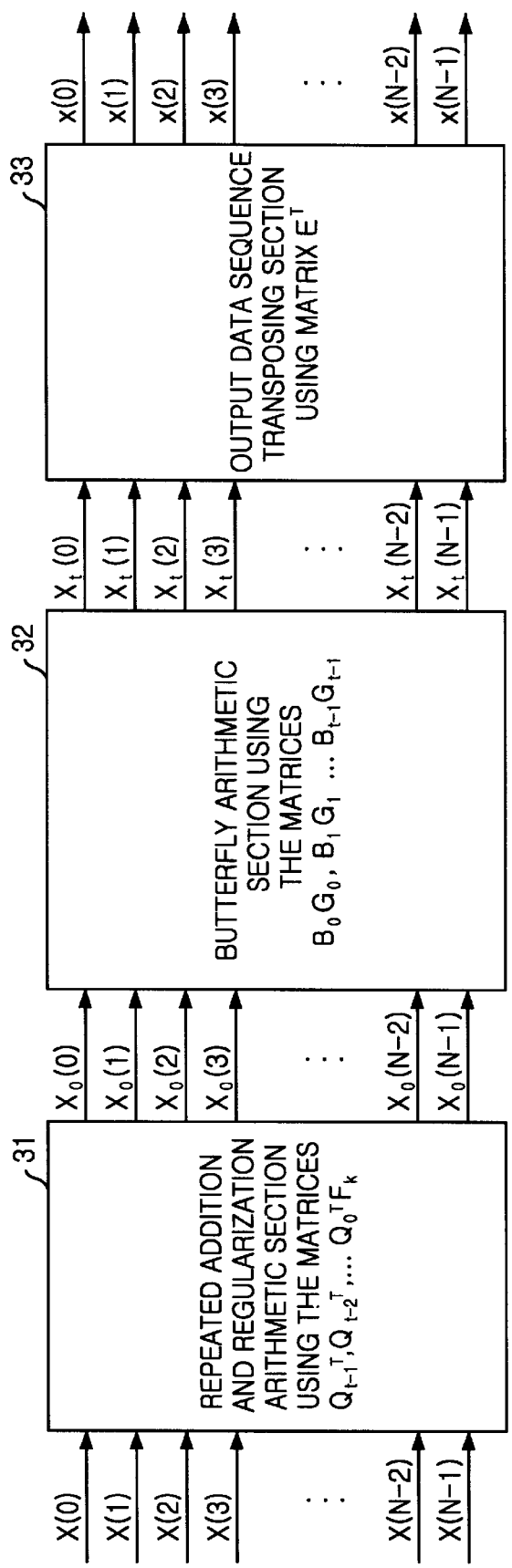
FIG. 3 illustrates an example of the one-dimensional or two-dimensional inverse fast DCT arithmetic apparatus and method according to the present invention.

FIG. 3 illustrates an example of the one-dimensional or two-dimensional inverse fast DCT arithmetic apparatus and method according to the present invention.

The one-dimensional inverse fast DCT arithmetic method of Formula (3) will be described referring to FIG. 3.

First as shown in FIG. 3, the N input data X(k) (k=0,1, ... N−1) are used as the input data for a repeated addition arithmetic operation by using a $Q_{t-1}^T.Q_{t-2}^T ... Q_0^T.F_k$ matrix. In this process, the repeated additions are carried out t times, and $Q_q^T$ is used for the q(q=0,1, ... , t−1)th repeated addition arithmetic operation. That is, $Q_0^T$ is used for the first repeated addition arithmetic, and $Q_t-1^T$ is used for the final repeated addition arithmetic. During the process of the repeated addition arithmetic, a regularization arithmetic is carried out simultaneously based on $F_k$.

Next, as shown in FIG. 3, $X_0(k)$ (k=0,1, ... , N−1) which is a data obtained as result of carrying out the repeated addition arithmetic is used as an input data for a butterfly arithmetic based on a $B_0G_0.B_1G_1 ... B_{t-1}G_{t-1}$ matrix. In this process, the butterfly arithmetic is carried out t times in all, and $B_qG_q$ is used for the qth (q=0,1, ... , t−1) butterfly arithmetic. That is, $B_{t-1}G_{t-1}$ is used for the first butterfly arithmetic, while $B_0G_0$ is used for the last butterfly arithmetic. In this context, $F_k$, $B_q$ and $G_q$ which are the matrices used in the one-dimensional forward and inverse fast DCT method are characterized in that $F_k = F_k^T$, $B_{q=Bq}^T$, and $G_q = G_q^T$.

Then as shown in FIG. 3, $X_t(k)$ (k=0,1, ... , N−1) which is a data obtained as a result of carrying out the butterfly arithmetic is made to undergo a transposition of the sequence by using a transposing matrix $E^T$. Consequently, there are obtained N final output data x(n) (n=0,1, ... , N−1) which are aligned sequentially.

Figure 4:
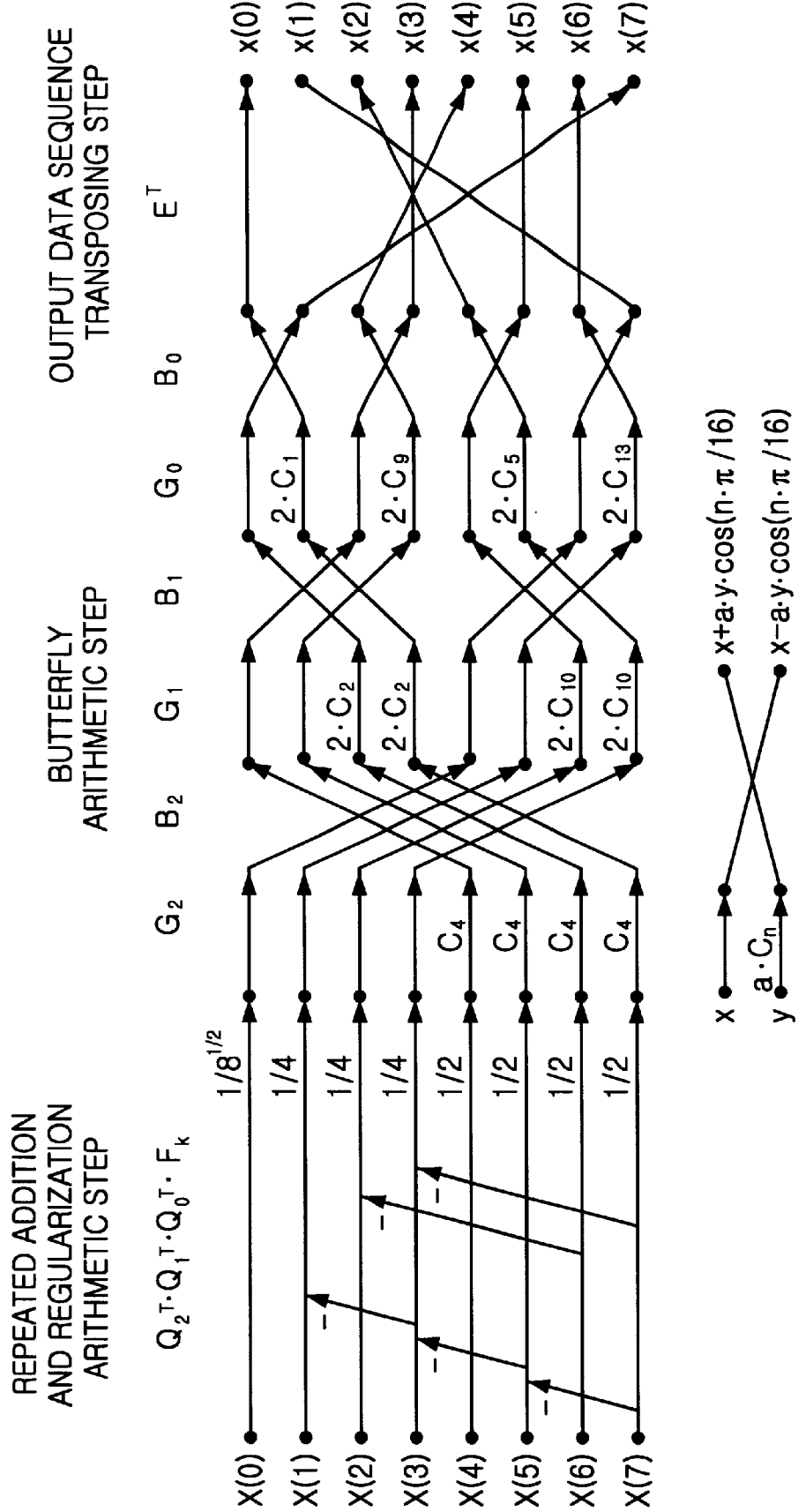
FIG. 4 is a flow chart showing an example of the one-dimensional or two-dimensional forward fast DCT arithmetic apparatus and method according to the present invention (N=8)

FIG. 4 is a flow chart showing an example of the one-dimensional or two-dimensional forward fast DCT arithmetic apparatus and method according to the present invention. This shows a data flow in the one-dimensional inverse fast DCT method in which the input data length N is 8.

In the case where the input data length N is 8, the sequentially inputted input data undergo a repeated addition and regularization arithmetic operation in which matrices $Q_2^T$, $Q_1^T$, $Q_0^T$, $F_k$ are used. Then the data which have undergone the repeated addition and regularization arithmetic are subjected to a butterfly arithmetic. During the butterfly arithmetic, the arithmetic steps based on $G_2$, $B_2$, $G_1$, $B_1$, $G_0$, and $B_0$ are sequentially executed. Then the data which are obtained as a result of carrying out the butterfly arithmetic are subjected to a transposition of the sequence of the output data by a transposing matrix $E^T$. Consequently, there are obtained the final output data which are sequentially aligned.

3. Two-dimensional Forward Fast DCT Arithmetic Apparatus and Method I

The two-dimensional forward fast DCT arithmetic apparatus and method I includes the steps of: a) transposing the sequence of the rows and columns of the two-dimensional input data; and b) carrying out a one-dimensional forward fast DCT in the row and column directions relative to the row-column-sequence-transposed two-dimensional data of the step a).

Now the two-dimensional forward fast DCT arithmetic apparatus and method I for an N×N (N=$2^t$) two-dimensional data as an example of the present invention will be described in detail referring to the attached drawings.

For the two-dimensional forward fast DCT arithmetic apparatus and method I, Formula (4) as shown below can be obtained by utilizing the rows and columns of the one-dimensional forward fast DCT matrix of Formula (2). In the two-dimensional forward fast DCT I of Formula (4) like the one-dimensional forward fast DCT, the positions of the input and output data are same during the intermediate arithmetic procedure. Therefore, there is the advantage that an additional memory is not required.

In Formula (4), [$x(n_1,n_2)$] and [$X(k_1,k_2)$] are respectively the two-dimensional input and output data having N×N data. Further, $n_1$ and $K_1$ respectively indicate the row positions of the two-dimensional input and output data, while $n_2$ and $k_2$ respectively indicate the column positions of the two-dimensional input and output data.

$$[X(k_1,k_2)] = \{F_k \cdot [Q_0 Q_1 \Lambda Q_{t-1}][G_{t-1}B_{t-1}\cdot G_{t-2}B_{t-2}\Lambda G_0 B_0].$$

$$[E]\cdot [x(n_1,n_2)]\cdot \{E^T[B_0 G_0 \cdot B_1 G_1 \Lambda B_{t-1} G_{t-1}]\cdot [Q_{t-1}{}^T\cdot Q_{t-2}\cdot \Lambda Q_0{}^T]F_k\} \quad (4)$$

FIG. 5 illustrates another example of the one-dimensional or two-dimensional forward fast DCT arithmetic apparatus and method according to the present invention.

Now the two-dimensional forward fast DCT arithmetic apparatus and method I of Formula (4) will be described referring to FIG. 5.

First, as shown in FIG. 5, $x(n_1,n_2)$ ($n_1,n_2=0,1, \ldots, N-1$) which are the sequentially inputted N×N input data are made to undergo transpositions of the sequence of the rows and columns by the transposing matrices $E^T$ and E. That is, the sequence of the rows of the input data $x(n_1,n_2)$ is transposed by the matrix E, while the sequence of the columns of the input data $x(n_1,n_2)$ is transposed by the matrix $E^T$.

Then a two-dimensional DCT is carried out on the data $x_0(n_1,n_2) = E \cdot x(n_1,n_2)E^T$ which have been sequence-transposed by the transposing matrices. In this context, taking the sequence-transposed data $x_0(n_1,n_2)=E \cdot x(n_1,n_2)E^T$ of the right part of the Formula (4) as the criterium, a one-dimensional forward DCT is carried out on the row data by the left part rows and columns $F_k \cdot [Q_0 \cdot Q_1 \Lambda Q_{t-1}][G_{t-1}B_{t-1}\cdot G_{t-2}B_{t-2}\Lambda G_0 B_0]$ while a one-dimensional forward DCT is carried out on the column data by the right part rows and columns $[B_0 G_0 \cdot B_1 G_1 \Lambda B_{t-1} G_{t-1}]\cdot [Q_{t-1}{}^T\cdot Q_{t-2}{}^T\cdot \Lambda Q_0{}^T]F_k$. Thus output data $X(k_1,k_2)$ ($k_1,k_2=0,1,\ldots,N-1$) which have undergone the two-dimensional forward DCT are sequentially obtained.

4. Two-dimensional Inverse Fast DCT Arithmetic Apparatus and Method I

The two-dimensional inverse fast DCT arithmetic apparatus and method I includes the steps of: a) carrying out a one-dimensional forward fast DCT on two-dimensional input data in the row and column directions; and b) transposing the sequence of the two-dimensional data after obtaining them.

Now the two-dimensional inverse fast DCT arithmetic apparatus and method I which has input data of N×N (N=$2^t$) as an example of the present invention will be described referring to the drawings.

The two-dimensional inverse fast DCT arithmetic method I can obtain Formula (5) as specified below, by utilizing the rows and columns of the one-dimensional forward fast DCT matrices of Formula (2). In the two-dimensional inverse fast DCT I of Formula 5 like the one-dimensional fast DCT, the positions of the input and output data are same during the intermediate arithmetic procedure. Therefore, there is the advantage that an additional memory is not required.

In Formula (5), [$x(n_1,n_2)$] and [$X(k_1,k_2)$] are respectively the two-dimensional input and output data having N×N data. Further, $n_1$ and $k_1$ respectively indicate the row positions of the two-dimensional input and output data, while $n_2$ and $k_2$ respectively indicate the column positions of the two-dimensional input and output data.

$$[x(n_1,n_2)] = \{E^T[B_0 G_0 \cdot B_1 G_1 \Lambda B_{t-1}G_{t-1}]\cdot [Q_{t-1}{}^T\cdot Q_{t-2}{}^T\cdot \Lambda Q_0{}^T]F_k\}.$$

$$[X(k_1,k_2)]\cdot \{F_k \cdot [Q_0 \cdot Q_1 \Lambda Q_{t-1}][G_{t-1}B_{t-1}\cdot G_{t-2}B_{t-2}\Lambda G_0 B_0]E\} \quad (5)$$

FIG. 6 illustrates another example of the one-dimensional or two-dimensional inverse fast DCT arithmetic apparatus and method according to the present invention.

Now the two-dimensional inverse fast DCT arithmetic apparatus and method I of Formula (5) according to the present invention will be described referring to FIG. 6.

First, as shown in FIG. 6, taking the input data $X(k_1,k_2)$ as the criterium, a one-dimensional inverse DCT is carried out on the row data of the input data $X(k_1,k_2)$ by the left part rows and columns $[B_0 G_0 B_1 G_1 \Lambda B_{t-1} G_{t-1}]\cdot [Q_{t-1}{}^T\cdot Q_{t-2}{}^T\Lambda Q_0{}^T]F_k$. While a one-dimensional inverse DCT is carried out on the column data of the input data $X(k_1,k_2)$ by the right part rows and columns $F_k \cdot [Q_0 Q_1 \Lambda Q_{t-1}][G_{t-1}B_{t-1}\cdot G_{t-2}B_{t-2}\Lambda G_0 B_0]$. Thus finally, output data $X_0(k_1,k_2)$ ($k_1,k_2=0,1,\ldots,N-1$) which have undergone the two-dimensional inverse DCT are sequentially obtained.

Then, the sequence of the rows of the input data $X_0(k_1,k_2)$ which have been obtained by carrying out the two-dimensional inverse DCT is transposed by the matrix $E^T$, while the sequence of the columns of the input data $X_0(k_1,k_2)$ is transposed by the matrix E. In this manner, the final output data $x(n_1,n_2)$ ($n_1,n_2=0,1,\ldots,N-1$) are sequentially obtained.

5. Two-dimensional Forward Fast DCT Arithmetic Apparatus and Method II

The two-dimensional forward fast DCT arithmetic apparatus and method II includes the steps of: a) transposing the sequence of the rows and columns of a two-dimensional input data; b) repeatedly carrying out a butterfly arithmetic on the two-dimensional data of the step a); and c) carrying out repeated addition and regularization arithmetic on the data of the step b).

Now the two-dimensional forward fast DCT arithmetic apparatus and method II having N×N (N=$2^t$) two-dimensional input data as an example of the present invention will be described referring to the attached drawings.

The two-dimensional forward fast DCT arithmetic apparatus and method II can obtain Formula (6) as shown below by utilizing the characteristics of the rows and columns and the arithmetic operator ⊗ of the one-dimensional forward fast DCT matrix of Formula (2). In the two-dimensional forward fast DCT II of Formula (6) like the one-dimensional fast DCT, the positions of the input and output data are same during the intermediate arithmetic procedure. Therefore, there is the advantage that an additional memory is not required. Further, the amount of the multiplying task is decreased by 25% compared with the two-dimensional forward fast DCT arithmetic apparatus and method I.

In Formula (6), [$x(n_1 N+n_2)]^T$ and $X(k_1 N+k_2)]^T$ respectively indicate input and output column vectors in which two-dimensional input and output data having N×N data are sequentially positioned in the row direction. Meanwhile, $n_1$ and $k_1$ respectively indicate the row positions of the two-dimensional output and input data, and $n_2$ and $k_2$ respectively indicate the column positions of the two-dimensional input and output data.

$$[X(k_1N+k_2)]^T = (F_k \otimes F_k)(Q_0 \otimes I_N)\Lambda(Q_{t-1} \otimes I_N)(I_N \otimes Q_0)\Lambda$$
$$(I_N \otimes Q_{t-1}) \cdot \{(S^T \otimes S^T)(A_{t-1} \otimes A_{t-1})(S \otimes S)\} \cdot \{(S^T \otimes S^T)$$
$$(H_{t-1} \otimes H_{t-1})(S \otimes S)\}\Lambda\{(S^T \otimes S^T)(A_0 \otimes A_0)(S \otimes S)\}.$$
$$\{(S^T \otimes S^T)(H_0 \otimes H_0)(S \otimes S)\}.(S^T \otimes S^T)(E_N \otimes E_N).$$
$$[x(n_1N+n_2)]^T \qquad (6)$$

The two-dimensional forward fast DCT arithmetic apparatus and method II based on Formula (6) is similar to the constitution and operation of FIG. 1. Therefore, the two-dimensional forward fast DCT arithmetic method II based on Formula (6) will be described referring to FIG. 1.

First, the sequentially inputted N×N input data $x(n_1,n_2)$ ($n_1,n_2=0,1, \ldots N-1$) are made to undergo a row/column sequence transposition arithmetic by using the transposing matrices $(S^T \otimes S^T T)$ $(E_N \otimes E_N)$. Then the data $x_0(n_1,n_2)$ which have been row-column-sequence-transposed by the transposing matrices $(S^T \otimes S^T)$ $(E_N \otimes E_N)$ are subjected to a butterfly arithmetic by using the right part rows and columns of Formula (6)

$$(S^T \otimes S^T)(A_{t-1} \otimes A_{t-1})\} \cdot \{(S^T \otimes S^T)(H_{t-1} \otimes H_{t-1})(S \otimes S)\}$$

$$\Lambda\{(S^T \otimes S^T)(A_0 \otimes A_0)(S \otimes S)\} \cdot \{S^T \otimes S^T\}(H_0 \otimes H_0)(S \otimes S)\}.$$

In this process, the butterfly arithmetic operations are carried out t times in all. At the first step, a butterfly arithmetic is carried out by using $$\{(S^T \otimes S^T)(A_0 \otimes A_0)(S \otimes S)\} \cdot \{(S^T \otimes S^T)(H_{t-1} \otimes H_{t-1})(S \otimes S)\},$$

while at the t-th step, a butterfly arithmetic is carried out by using $$\{(S^T \otimes S^T)(A_{t-1} \otimes A_{t-1})(S \otimes S)\} \cdot \{(S^T \otimes S^T)(H_{t-1} \otimes H_{t-1})$$
$$(S \otimes S)\}.$$

Then the data $x_t(n_1,n_2)$ which have been obtained by carrying out the butterfly arithmetic are made to undergo a repeated addition and regularization arithmetic by using the matrices of Formula (6) $(F_k \otimes F_k)(Q_0 \otimes I_N)\Lambda(Q_{t-1} \otimes I_N)$ $(I_N \otimes Q_0)\Lambda(I_N \otimes Q_{t-1})$. Thus finally, there are sequentially obtained the output data $X(k_1,k_2)$ ($k_1,k_2=0,1, \ldots N-1$) which have undergone the two-dimensional forward DCT.

6. Two-dimensional Inverse Fast DCT Arithmetic Apparatus and Method II

The two-dimensional inverse fast DCT arithmetic apparatus and method II includes the steps of: a) carrying out a repeated addition and regularization arithmetic on two-dimensional input data; b) carrying out a butterfly arithmetic on the data of the step a); and c) carrying out an output sequence transposing arithmetic on the data of the step b).

Now the two-dimensional inverse fast DCT arithmetic apparatus and method II having N×N ($N=2^t$) data according to the present invention will be described referring to the attached drawings.

The two-dimensional inverse fast DCT arithmetic apparatus and method II can obtain Formula (7) as shown below by utilizing the characteristics of the rows and columns and the arithmetic operator $\otimes$ of the one-dimensional forward fast DCT matrix of Formula (2). In the two-dimensional inverse fast DCT II of Formula (7) like the one-dimensional fast DCT, the positions of the input and output data are same during the intermediate arithmetic procedure. Therefore, there is the advantage that an additional memory is not required. Further, the amount of the multiplying task is decreased by 25% compared with the two-dimensional forward fast DCT arithmetic apparatus and method I.

In Formula (7), $[x(n_1N+n_2)]^T$ and $[X(k_1,k_2)]^T$ respectively indicate input and output column vectors in which two-dimensional input and output data having N×N data are sequentially positioned in the row direction. Meanwhile, $n_1$ and $k_1$ respectively indicate the row positions of the two-dimensional output and input data, while $n_2$ and $k_2$ respectively indicate the column positions of the two-dimensional input and output data.

$$[x(n_1N+n_2)]^T = (E_N^T \otimes E_N^T)(S \otimes S) \cdot \{(S \otimes S)(A_0 \otimes A_0)(S^T \otimes S^T)\}.$$
$$\{(S \otimes S)(H_0 \otimes H_0)(S^T \otimes S^T)\}\{\Lambda(S \otimes S)(A_{t-1} \otimes A_{t-1})$$
$$(S^T \otimes S^T)\} \cdot \{(S \otimes S)(H_{t-1} \otimes H_{t-1})(S^T \otimes S^T)\} \cdot (Q_{t-1}^T \otimes I_N)\Lambda$$
$$(Q_0^T \otimes I_N)(I_N \otimes Q_{t-1}^T)\Lambda(I_N \otimes Q_0^T)(F_k \otimes F_k) \cdot [X(k_1N+k_2)]^T \quad (7)$$

The two-dimensional inverse fast DCT arithmetic apparatus and method II based on Formula (7) is similar to the constitution and operation of FIG. 3. Therefore, the two-dimensional inverse fast DCT arithmetic method II based on Formula (7) will be described referring to FIG. 3.

First, the sequentially inputted N×N input data $X(k_1,k_2)$ ($k_1,k_2=0,1, \ldots N-1$) are made to undergo a repeated addition and regularization arithmetic by using the matrices $(Q_{t-1}^T \otimes I_N)\Lambda(Q_0^T \otimes I_N)(I_N \otimes Q_{t-1}^T)\Lambda(I_N \otimes Q_0^T)(F_k \otimes F_k)$ of Formula (7). Then the data $X(k_1,k_2)$ which have been obtained by carrying out the repeated addition and regularization arithmetic are subjected to a butterfly arithmetic by using the matrices of Formula (7)

$$\{(S \otimes S)(A_0 \otimes A_0)(S^T \otimes S^T)\} \cdot \{(S \otimes S)(H_0 \otimes H_0)(S^T \otimes S^T)\}$$
$$\Lambda\{(S \otimes S)(A_{t-1} \otimes A_{t-1})(S^T \otimes S^T)\} \cdot \{(S \otimes S)$$
$$(H_{t-1} \otimes H_{t-1})(S^T \otimes S^T)\}$$

In this process, the butterfly arithmetic operations are carried out t times in all. At the first step, the butterfly arithmetic is carried out by using $\{(S \otimes S)(A_{t-1} \otimes A_{t-1})(S_T \otimes S^T)\} \cdot \{(S \otimes S)(H_{t-1} \otimes H_{t-1})(S^T \otimes S^T)\}$, while at the t-th step, a butterfly arithmetic is carried out by using $(S \otimes S)(A_0 \otimes A_0)(S^T \otimes S^T)\} \cdot \{(S \otimes S)(H_0 \otimes H_0)(S^T \otimes S^T)\}$.

Then the data $X_t(k_1,k_2)$ which have been obtained by carrying out the butterfly arithmetic are made to undergo a sequence transposition arithmetic by using the transposing matrix $(E_N^T \otimes E_N^T)(S \otimes S)$. Thus finally, there are sequentially obtained the output data $x(n_1,n_2)$ ($n_1,n_2=0,1, \ldots, N-1$) which have undergone the two-dimensional inverse DCT.

In the above, the present invention was described based on the specific preferred embodiments and the drawings, but it should be apparent to those ordinarily skilled in the art that various changes and modifications can be added without departing from the spirit and scope of the present invention.

According to the present invention as described above, in the intermediate arithmetic procedure of the one-dimensional or two-dimensional forward or inverse DCT, the positions of the input and output data are same, and therefore, an additional memory is not required.

Further, during the intermediate arithmetic for the two-dimensional DCT method, a sequence transposition is not required, and therefore, a transposition memory is not required.

What is claimed is:

1. An apparatus for carrying out a two-dimensional forward fast DCT with the same positions of input and output data, comprising:

a reordering means for reordering sequences of rows and columns of an externally inputted two-dimensional input data by using reordering matrices $E^T$ and E; and a row/column DCT means for carrying out a one-dimensional forward DCT by using an $F_k \cdot \{Q_0 \cdot Q_1 \_ Q_{t-1}\{.\}G_{t-1}B_{t-1} \cdot G_{t-2}B_{t-2}\_G_0B_0\}$ matrix on a row data obtained as a result of transposing the sequences of rows and columns of the externally inputted two-dimensional input data by said reordering means, and for carrying out a one-dimensional forward DCT by using a $\{B_0G_0 \cdot B_1G_1\_B_{t-1}G_{t-1}\{.\}Q_{t-1}^T \cdot Q_{t-2}^T\_Q_0^T\}F_k$ matrix on a column data obtained as a result of reordering the sequences of rows and columns of the externally inputted two dimensional input data by said reordering means.

2. A method applied to an apparatus for carrying out a two-dimensional forward fast DCT with the same positions of input and output data, comprising the steps of:
   a) reordering sequences of rows and columns of an externally inputted two-dimensional input data by using reordering matrices $E^T$ and $E$; and
   b) carrying out a one-dimensional forward DCT by using an $F_k \cdot \{Q_0 \cdot Q_1\_Q_{t-1}\} \cdot \{G_{t-1}B_{t-1} \cdot G_{t-2}B_{t-2}\_G_0B_0\}$ matrix on a row data obtained as a result of reordering the sequences of rows and columns of the externally inputted two-dimensional input data at the step a), and for carrying out a one-dimensional forward DCT by using a $\{B_0G_0 \cdot B_1G_1\_B_{t-1}G_{t-1}\} \cdot \{Q_{t-1}^T \cdot Q_{t-2}^T\_Q_0^T\}F_k$ matrix on a column data obtained as a result of reordering the sequences of rows and columns of the externally inputted two-dimensional input data at the step a).

3. An apparatus for carrying out a two-dimensional inverse fast DCT with the sane positions of input and output data, comprising:
   a row/column DCT means for carrying out a one-dimensional inverse DCT by using a $\{B_0G_0 \cdot B_1G_1\_B_{t-1}G_{t-1}\} \cdot \{Q_{t-1}^T \cdot Q_{t-2}^T\_Q_0^T\}F_k$ matrix on a matrix on a row data of an externally inputted two-dimensional input data, and for carrying out a one-dimensional inverse DCT by using an $F_k \cdot \{Q_0 \cdot Q_1\_Q_{t-1}\{.\}G_{t-1}B_{t-1} \cdot G_{t-2}B_{t-2}\_G_0B_0\}$ matrix on a column data of the externally inputted two-dimensional input data; and
   reordering means for reordering sequences of rows and columns of two-dimensional input data obtained from said row/column inverse DCT means, by using reordering in matrices $E^T$ and $E$.

4. A method applied to an apparatus for carrying out a two-dimensional inverse fast DCT with the same positions of input and output data, comprising the steps of:
   a) carrying out a one-dimensional inverse DCT by using a $\{B_0G_0 \cdot B_1G_1\_B_{t-1}G_{t-1}\} \cdot \{Q_{t-1}^T \cdot Q_{t-2}^T\_Q_0^T\}F_k$ matrix on a row data of an externally inputted two-dimensional input data, and for carrying out a one-dimensional inverse DCT by using an $F_k \cdot \{Q_0 \cdot Q_1\_Q_{t-1}\{.\}G_{t-1}B_{t-1} \cdot G_{t-2}B_{t-2}\_G_0B_0\}$ matrix on a column data of the externally inputted two dimensional input data; and
   b) reordering sequences of rows and columns of two dimensional input data obtained from said row/column inverse DCT means, by using reordering matrices $E^T$ and $E$.

5. An apparatus for carrying out a two-dimensional forward fast DCT with the same positions of input and output data, comprising:
   a reordering means for reordering sequences of rows and columns of an externally inputted two-dimensional input data by using a reordering matrix $(S^T \otimes S^T)(E_N \otimes E_N)$;

a butterfly arithmetic means for carrying out a butterfly arithmetic operation by using a $\{(S^T \otimes S^T)(A_{t-1} \otimes A_{t-1})(S \otimes S)\}\{(S^T \otimes S^T)(H_{t-1} \otimes H_{t-1})(S \otimes S)\}\_\{(S^T \otimes S^T)(A_0 \otimes A_0)(S \otimes S)\}\{(S^T \otimes S^T)(H_0 \otimes H_0)(S \otimes S)\}$ matrix on a two-dimensional data obtained as a result of transposing the sequences of the two dimensional data by said input data row sequence/column sequence reordering means; and a repeated addition and regularization arithmetic means for carrying out a repeated addition and regularization arithmetic operation by using a $(F_k \otimes F_k)(Q_0 \otimes I_N)\_(Q_{t-1} \otimes I_N)(I_N \otimes Q_0)\_(I_N \otimes Q_{t-1})$ matrix on a data obtained as a result of carrying out the butterfly arithmetic operation by said butterfly arithmetic means.

6. A method applied to an apparatus for carrying out a two-dimensional forward fast DCT with the same positions of input and output data, comprising the steps of:
   a) reordering sequences of rows and columns of an externally inputted two-dimensional input data by using a reordering matrix $(S^T \otimes S^T)(E_N \otimes E_N)$;
   b) carrying out a butterfly arithmetic operation by using a $\{(S^T \otimes S^T)(A_{t-1} \otimes A_{t-1})(S \otimes S)\}\{(S^T \otimes S^T)(H_{t-1} \otimes H_{t-1})(S \otimes S)\}\_\{(S^T \otimes S^T)(A_0 \otimes A_0)(S \otimes S)\}\{(S^T \otimes S^T)(H_0 \otimes H_0)(S \otimes S)\}$ matrix on a two-dimensional data obtained as a result of reordering the sequences of the two dimensional at the step a); and
   c) carrying out a repeated addition and regularization arithmetic operation by using a $(F_k \otimes F_k)(Q_0 \otimes I_N)\_(Q_{t-1} \otimes I_N)(I_N \otimes Q_0)\_(I_N \otimes Q_{t-1})$ matrix on a data obtained as a result of the butterfly arithmetic operation at the step b).

7. An apparatus for carrying out a two-dimensional inverse fast DCT with the same positions of input and output data, comprising:
   a repeated addition and regularization arithmetic means for carrying out a repeated addition and regularization arithmetic operation by using a $(Q_{t-1}^T \otimes I_N)\_(Q_0^T \otimes I_N))(I_N \otimes Q_{t-1}^T)\_(I_N \otimes Q_0^T)(F_k \otimes F_k)$ matrix on an externally inputted two-dimensional input data;
   a butterfly arithmetic means for carrying out a butterfly arithmetic operation by using a $\{(S \otimes S)(A_0 \otimes A_0)(S^T \otimes S^T)\}\{(S \otimes S)(H_0 \otimes H_0)(S^T \otimes S^T)\}\_\{(S \otimes S)(A_{t-1} \otimes A_{t-1})(S^T \otimes S^T)\}\{(S \otimes S)(H_{t-1} \otimes H_{t-1})(S^T \otimes S^T)\}$ matrix on a two-dimensional data obtained as a result of carrying out the repeated addition and regularization arithmetic operation on the two-dimensional data by said repeated addition and regularization arithmetic means; and
   a reordering means for reordering a sequence of a two-dimensional output data by using a $(E_N^T \otimes E_N^T)(S \otimes S)$ matrix on a two-dimensional data obtained as a result of carrying out the butterfly arithmetic operation by said butterfly arithmetic means.

8. A method applied to an apparatus for carrying out a two-dimensional inverse fast DCT with the same positions of input and output data, comprising the steps of:
   a) carrying out a repeated addition and regularization arithmetic operation by using a $(Q_{t-1}^T \otimes I_N)\_(Q_0^T \otimes I_N))(I_N \otimes Q_{t-1}^T)\_(I_N \otimes Q_0^T)(F_k \otimes F_k)$ matrix on an externally inputted two-dimensional input data;
   b) carrying out a butterfly arithmetic operation by using a $\{(S \otimes S)(A_0 \otimes A_0)(S^T \otimes S^T)\}\{(S \otimes S)(H_0 \otimes H_0)(S^T \otimes S^T)\}\_\{(S \otimes S)(A_{t-1} \otimes A_{t-1})(S^T \otimes S^T)\}\{(S \otimes S)(H_{t-1} \otimes H_{t-1})(S^T \otimes S^T)\}$ matrix on a two-dimensional data obtained as a result of carrying out the repeated addition and regularization arithmetic operation on the two dimensional data at the step a); and c) reordering a sequence of a two-dimensional output data by using a $(E_N^T \otimes E_N^T)(S \otimes S)$ matrix on a two-dimensional data obtained as a result of carrying out the butterfly arithmetic operation at the step b).

9. A recording medium readable by a computer with a program loaded thereon to be applied to a fast DCT arithmetic apparatus, comprising the functions of:

a) reordering sequences of rows and columns of an externally inputted two-dimensional input data by using reordering matrices $E^T$ and E; and b) carrying out a one-dimensional forward DCT by using an $F_k \cdot \{Q_0 \cdot Q_1 \_ Q_{t-1}\{\cdot\} G_{t-1} B_{t-1} \cdot G_{t-2} B_{t-2} \_ G_0 B_0\}$ matrix on a row data obtained as a result of reordering the sequences of rows and columns of the externally inputted two-dimensional input data by the first function, and carrying out a one-dimensional forward DCT by using a $\{B_0 G_0 \cdot B_1 G_1 \_ B_{t-1} G_{t-1}\} \cdot \{Q_{t-1}^T \cdot Q_{t-2}^T \_ Q_0^T\} F_k$ matrix on a column data obtained as a result of reordering the sequences of rows and columns of the externally inputted two-dimensional input data.

10. A recording medium readable by a computer with a program loaded thereon to be applied to a fast DCT arithmetic apparatus, comprising the functions of:

a) carrying out a one-dimensional inverse DCT by using a $\{B_0 G_0 \cdot B_1 G_1 \_ B_{t-1} G_{t-1}\} \cdot \{Q_{t-1}^T \cdot Q_{t-2}^T \_ Q_0^T\} F_k$ matrix on a row data of an externally inputted two-dimensional input data, and carrying out a one-dimensional inverse DCT by using an $F_k \cdot \{Q_0 \cdot Q_1 \_ Q_{t-1}\{\cdot\} G_{t-1} B_{t-1} \cdot G_{t-2} B_{t-2} \_ G_0 B_0\}$ matrix on a column data of the externally inputted two-dimensional input data; and b) reordering sequences of rows and columns; of the two-dimensional input data obtained from the function a), by using reordering matrices $E^T$ and E.

11. A recording medium readable by a computer with a program loaded thereon to be applied to a fast DCT arithmetic apparatus, comprising the functions of:

a) reordering sequences of rows and columns of an externally inputted two-dimensional input data by using a reordering matrix $(S^T \otimes S^T)(E_N \otimes E_N)$;

b) carrying out a butterfly arithmetic operation by using a $\{(S^T \otimes S^T)(A_{t-1} \otimes A_{t-1})(S \otimes S)\}\{(S^T \otimes S^T)(H_{t-1} \otimes H_{t-1})(S \otimes S)\} \_ \{(S^T \otimes S^T)(A_0 \otimes A_0)(S \otimes S)\}\{(S^T \otimes S^T)(H_0 \otimes H_0)(S \otimes S)\}$ matrix on a two-dimensional data obtained as a result of reordering the sequences of the two dimensional data; and c) carrying out a repeated addition and regularization arithmetic operation by using a $(F_k \otimes F_k)(Q_0 \otimes I_N) \_ (Q_{t-1} \otimes I_N)(I_N \otimes Q_0) \_ (I_N \otimes Q_{t-1})$ matrix on a data obtained as a result of carrying out the butterfly arithmetic operation.

12. A recording medium readable by a computer with a program loaded thereon to be applied to a fast DCT arithmetic apparatus, comprising the functions of:

a) carrying out a repeated addition and regularization arithmetic operation by using a $(Q_{t-1}^T \otimes I_N) \_ (Q_0^T \otimes I_N)(I_N \otimes Q_{t-1}^T) \_ (I_N \otimes Q_0^T)(F_k \otimes F_k)$ matrix on an externally inputted two-dimensional input data;

b) carrying out a butterfly arithmetic operation by using a $\{(S \otimes S)(A_0 \otimes A_0)(S^T \otimes S^T)\}\{(S \otimes S)(H_0 \otimes H_0)(S^T \otimes S^T)\} \_ \{(S \otimes S)(A_{t-1} \otimes A_{t-1})(S^T \otimes S^T)\}\{(S \otimes S)(H_{t-1} \otimes H_{t-1})(S^T \otimes S^T)\}$ matrix on a two-dimensional data obtained as a result of carrying out the repeated addition and regularization arithmetic operation on the two dimensional data; and c) reordering sequence of a two-dimensional output data by using a $(E_N \otimes E_N)(S \otimes S)$ matrix on a two-dimensional data obtained as a result of carrying out the butterfly arithmetic operation.

* * * * *